United States Patent [19]
Bush

[11] 3,815,543

[45] June 11, 1974

[54] TRANSMISSION CONTROL INDICATOR MECHANISM

[75] Inventor: Ray E. Bush, Drayton Plains, Mich.

[73] Assignee: General Motors Corporation, Detroit, Mich.

[22] Filed: Aug. 3, 1972

[21] Appl. No.: 277,624

[52] U.S. Cl.............. 116/124 R, 74/475, 240/1 EL
[51] Int. Cl.............................................. G09f 9/00
[58] Field of Search......... 116/124 R, 133, DIG. 20; 240/2.1, 8.16, 1 EL; 74/473, 475

[56] References Cited
UNITED STATES PATENTS

| | | | |
|---|---|---|---|
| 2,612,133 | 9/1952 | Crawford | 116/124 R |
| 2,738,755 | 3/1956 | Doane | 116/124 R |
| 2,898,880 | 8/1959 | Newton, Jr. | 240/2.1 X |
| 2,925,061 | 2/1960 | Thornburgh et al. | 116/124 R |
| 3,625,179 | 12/1971 | Allen, Jr. et al. | 240/1 EL |
| 3,695,215 | 10/1972 | Lambiris | 116/124 R |

*Primary Examiner*—Louis J. Capozi
*Attorney, Agent, or Firm*—Warren E. Finken

[57] ABSTRACT

The drawings illustrate a simplified, compact and efficient instrument panel-mounted shift indicator mechanism including combined camming and slidable pivot means for guiding a pointer along a substantially vertical path adjacent a light conducting member bearing the usual shift selector indicia, and lighting means for diffusing light throughout both the light conducting member and the pointer.

3 Claims, 5 Drawing Figures

PATENTED JUN 11 1974 3,815,543

TRANSMISSION CONTROL INDICATOR MECHANISM

This invention relates generally to indicator mechanisms and, more particularly, to indicator mechanisms adapted for use with vehicle transmissions.

It is essential that shift indicator mechanisms be compact, readily mountable, highly efficient in operation, and effectively illuminated when the instrument panel lights are turned on.

Accordingly, an object of the invention is to provide an improved simplified and compact instrument panel-mounted shift indicator mechanism wherein the rotary movement of the steering column shift tube is translated into efficient vertical linear motion of the shift indicator pointer.

Another object of the invention is to provide an improved shift indicator mechanism including cooperative cam and slidable pivot means associated with the shift indicator pointer for guiding the pointer along a substantially vertical path in response to the pull of a cable connected between the pointer and the usual pivotable steering column shift tube.

A further object of the invention is to provide an improved shift indicator mechanism including means for effectively diffusing light from a single light source through both the shift indicator pointer and an adjacent light conducting member bearing the usual shift selector indicia.

Still another object of the invention is to provide an improved shift indicator mechanism including a housing having an L-shaped transparent light conducting member adapted thereto and a translucent lever assembly pivotally mounted thereon. Specifically, the translucent lever assembly consists of a spring-loaded cam follower slidably mounted in a contoured cam slot formed in a side wall of the housing, forwardly and rearwardly extending aligned arms formed integrally with the cam follower adjacent the outer surface of the side wall, and a pointer extending transversely from the forward arm intermediate the light conducting member and a forward wall of the housing, with a tapered end face formed on the free end of each of the arms such that light from a single light source is deflected by the rear end face and diffused along the lengths of the rear and forward arms and, thence, deflected by the forward end face and diffused along the length of the pointer. The L-shaped light conducting member is arranged such that light from the single light source enters an edge or end face of the light conducting member and is diffused along the horizontal base thereof and then directed upwardly along the vertical stem thereof, thus illuminating shift selector indicia formed on the light conducting member.

These and other objects and advantages of the invention will be apparent when reference is made to the following description and accompanying drawings, wherein.

Figure 1:
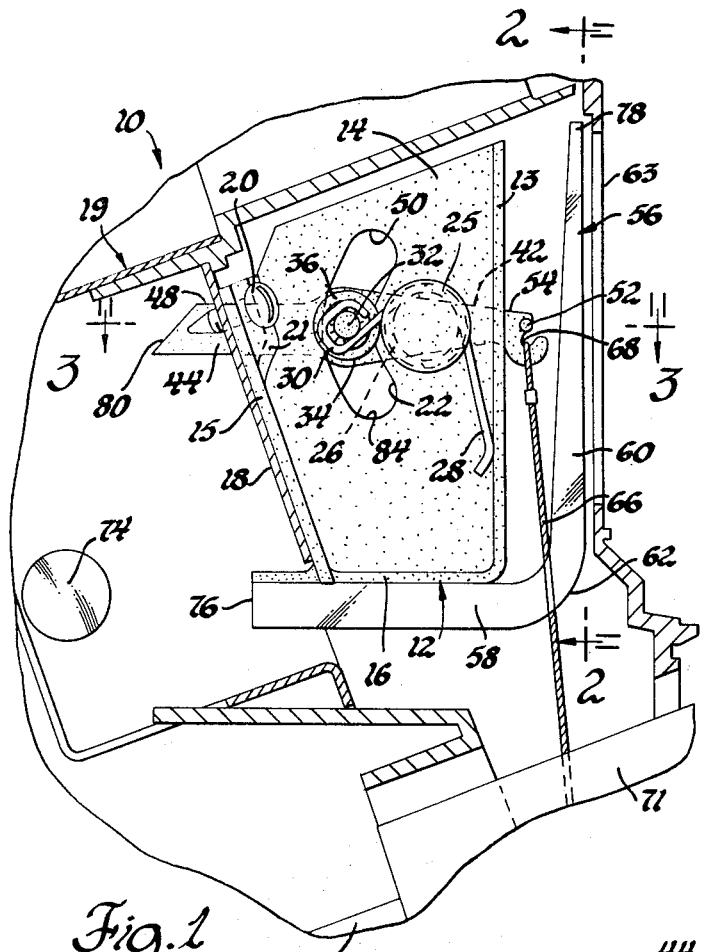
FIG. 1 is a fragmentary cross-sectional view of an automotive vehicle instrument panel and steering column arrangement embodying the invention.
Figure 2:
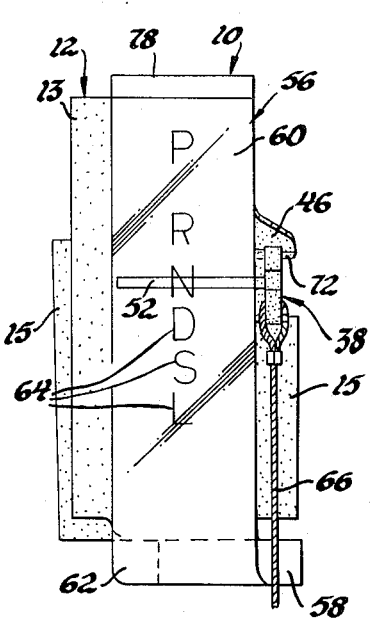
FIG. 2 is a view of a portion of FIG. 1, taken along the plane of line 2—2 thereof, and looking in the direction of the arrows.
Figure 3:
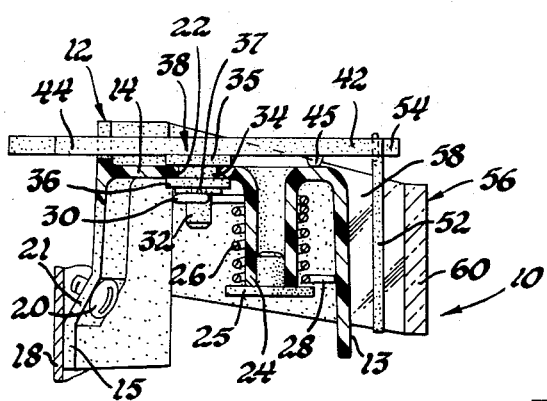
FIG. 3 is a cross-sectional view taken along line 3—3 of FIG. 1, and looking in the direction of the arrows.

Referring to the drawings in greater detail, FIGS. 1-3 illustrate an indicator assembly 10 including a plastic housing 12 having a forward wall 13, a side wall 14, a rear wall 15, and a bottom wall 16. It may be noted in FIG. 1 that the rear wall 15 is mounted on a fixed wall 18 of the usual light cluster housing 19, and secured thereto by a single screw 20, extending through an offset portion 21 formed on the rear wall 15. A cam slot 22, having a predetermined boomerang-like shape, is formed in the side wall 14. A cylindrical mounting member 24 (FIG. 3) is formed on the side wall 14 adjacent the cam slot 22 and extends into the housing 12 between the respective forward and rear walls 13 and 15. A retainer collar 25 is formed on the inner end of the mounting member 24.

A coil spring 26 (FIG. 3) is mounted around the cylindrical member 24 between the retainer collar 25 and the inner surface of the side wall 14, with one laterally extended end 28 (FIG. 1) of the spring 26 abutting against the inner surface of the forward wall 13 and the other extended end 30 thereof being formed in a loop around a pin 32 extending horizontally from a cam follower 34 mounted in the cam slot 22. A spacer member 35 is formed on the cam follower 34 exterior of the side wall 14. The spacer member 35 is retained in sliding contact with the outer surface of the side wall 14 by a washer 36 and a suitable nut 37, the nut 37 also serving to retain the washer 36 in sliding contact with the inner surface of the side wall 14. A lever 38 formed of a translucent plastic is molded integrally with the spacer member 35 and extends transversely across the outer face 40 of the cam follower 34, the lever 38 having a forwardly extending arm 42 and a rearwardly extending arm 44, both extending parallel to the side wall 14. A boss 45 (FIG. 3) is formed on the side of the arm 42 substantially the same height as the thickness of the spacer member 35 for sliding contact with the outer surface of the side wall 14 to help retain the lever 38 parallel thereto. An abutment 46 (FIG. 2) is formed on the outer surface of the side wall 14 adjacent the upper edge 48 of the rearwardly extending arm 44, serving as a fulcrum for the arm 44.

The end 30 of the spring 26 urges the cam follower 34 toward the uppermost arcuate edge 50 of the cam slot 22. The forwardly extending arm 42 extends beyond the forward wall 13, while the rearwardly extending arm 44 extends past the abutment 46 beyond the rear wall 15.

A pointer 52 is formed adjacent the free end portion 54 of the arm 42 and extends transversely across the outer face of the forward wall 13, intermediate the wall 13 and an adjacent substantially vertical clear plastic light conducting member 56. If desired, the translucent pointer 52 may be painted a bright color, in contrast to the adjacent clear plastic light conducting member 56. The light conducting member 56 includes a horizontal base portion 58 with an indicator wall 60 extending vertically therefrom, there being a bent portion 62 interconnecting the base 58 and the wall 60. The base portion 58 is secured along its upper surface to the bottom wall 16, while the indicator wall 60 extends adjacent the engine side of the usual instrument panel 63. The usual P-R-N-D-S-L shift selector indicia 64 are stamped or etched on the vertical wall 60 of the light conducting member 56, as may be noted in FIG. 2. A cable 66 is connected at one end thereof in a groove or slot 68 (FIG. 1) formed in the end portion 54 of the arm 42 and at the other end thereof in any suitable manner to the usual steering column shift tube 70 pivotally mounted within a shift bowl 71.

In operation, manual rotation of the shift tube 70 via the selector lever (not shown) in the usual manner pulls the cable 66 and the arm 42 of the lever 38 and, consequently, the pointer 52 downwardly to the selected drive ratio indicator position, causing the cam follower 34 to slide downwardly along the cam slot 22, with the rearwardly extending arm 44 serving as a slidable pivot along the bottom edge 72 (FIG. 2) of the abutment fulcrum 46 formed on the outside face of the side wall 14. The boomerang shape of the cam slot 22 is such that, as the cam follower 34 is pulled downwardly therealong against the force of the spring 26, the pointer 52 is caused to move substantially vertically intermediate the forward wall 13 and the adjacent inner surface of the indicator wall 60. The spring 26 urges the cam follower 34 toward the upper edge 50 of the cam slot 22 and, hence, the pointer 52 toward PARK ("P"), when the selector lever is moved out of the "R," "N," "D," "S," and "L" positions.

ILLUMINATION SYSTEM

Referring now to FIG. 1, there is illustrated a light source 74 mounted in the light cluster housing 19 positioned apart from and substantially horizontally aligned with the end face 76 of the base portion 58 of the light conducting member 56. It may be noted in FIG. 1, also, that the vertical indicator wall 60 tapers so as to be narrower at the extreme upper end 78 thereof.

The light transmitted from the light source 74 to the end face 76 of the light conducting member base portion 58 is diffused laterally across the base portion 58 and, thence, around the bent portion 62 and upwardly through the full height of the vertical indicator wall 60, the taper of the wall 60 serving to cause the intensity of the light to be the same at all points along the wall 60, thereby uniformly displaying all of the shift selector indicia 64 formed thereon.

Figure 4:
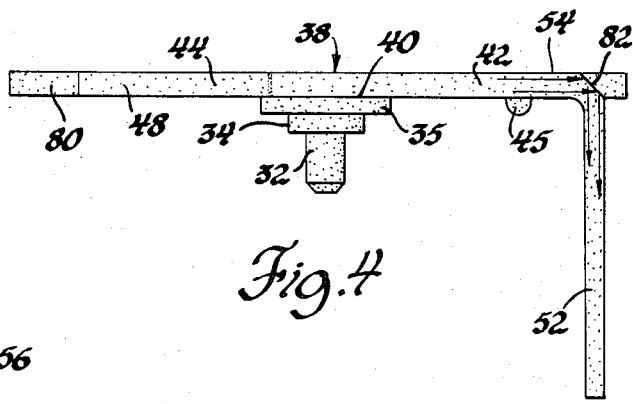
FIGS. 4 and 5 are enlarged top and side views, respectively, of a portion of the FIG. 1 structure.
Figure 5:
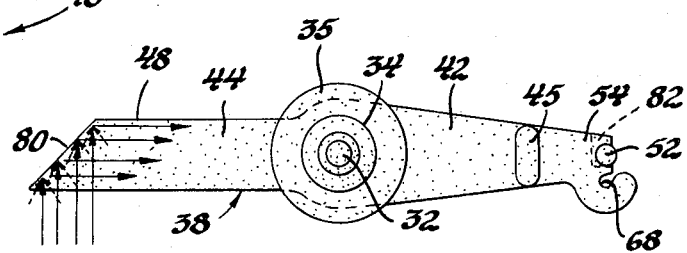

As illustrated in FIGS. 4 and 5, a tapered end face 80 is formed on the free end of the arm 44 of the lever 38, while a tapered end face 82 is formed on the free end of the arm 42 adjacent the integrally connected end of the pointer 52. As may be noted in FIG. 1, the face 80 is formed so as to be tapered approximately 45 degrees from vertical when the lever 38 is positioned horizontally, sloping upwardly toward the instrument panel 63. As such, tests have indicated that regardless of the variation in slope assumed by the face 80 (FIG. 5), as the cam follower 34 travels between the upper edge 50 (FIG. 1) and the lower edge 84 of the cam slot 22, the light rays from the light source 74 are reflected by the face 80 (FIG. 5) and diffused along the full length of the arms 44 and 42. As shown in FIG. 4, the face 82 formed on the free end of the arm 42 is tapered at approximately 45 degrees with respect to both the axes of the arm 42 and the pointer 52. As such, the light rays which have been directed along the arm 42 are reflected by the face 82 and diffused along the length of the pointer 52.

Inasmuch as the light conducting member 56 bearing the shift selector indicia 64 is formed of clear plastic and the pointer 52 is formed of a suitably colored translucent plastic, and both are filled with light directed thereto from the source 74, maximum visibility is thus provided for the operator.

It is apparent that the invention provides a simplified, compact, and readily mountable instrument panel-mounted indicator mechanism which is highly efficient in operation and effectively illuminated when the instrument panel lights are turned on.

While but one embodiment of the invention has been shown and described, other modifications thereof are possible.

I claim:

1. For mounting on a vehicular instrument panel including support means and a light source, an indicator mechanism comprising a housing having forward, side, rear, and bottom walls, said rear wall being adaptable for mounting on said support means; a contoured cam slot formed in said side wall; an abutment formed on the outer surface of said side wall adjacent said rear wall; a first mounting pin formed integrally with the inner surface of said side wall adjacent said cam slot; a lever assembly formed of translucent material including a cam follower slidably mounted in said cam slot, a second mounting pin formed integrally with said cam follower and extending inwardly from said side wall with the axis thereof parallel to the axis of said first mounting pin; a spacer member formed integrally with said cam follower and slidably mounted on the outer surface of said side wall, rearwardly and forwardly extending aligned arms formed integrally with said spacer member and extending beyond said rear and forward walls, respectively, said rearwardly extending arm being in sliding contact along the top edge thereof with said abutment, a pointer integrally formed adjacent the free end of said forwardly extending arm and extending transversely therefrom across the outer surface of said forward wall, and a cable-connecting notch formed in said free end adjacent said pointer; a coil spring mounted on said first mounting pin, said coil spring having one end thereof extended so as to contact the inner surface of said forward wall and the other end thereof extended and formed around said second mounting pin; a tapered end face formed on the free end of said rearwardly extending arm; and a beveled end face formed on the free end of said forwardly extending arm adjacent said pointer, said tapered end face deflecting light from said light source and diffusing said light along said rearwardly and forwardly extending arms, and said beveled end face deflecting said diffused light from said forwardly extending arm and diffusing said light along said pointer, thereby illuminating said pointer.

2. For mounting on a vehicular instrument panel including support means and a light source, an indicator mechanism comprising a housing having forward, side, rear, and bottom walls, said rear wall being adaptable for mounting on said support means; a contoured cam slot formed in said side wall; an abutment formed on the outer surface of said side wall adjacent said rear wall; a first mounting pin formed integrally with the inner surface of said side wall adjacent said cam slot; a lever assembly including a cam follower slidably mounted in said cam slot, a second mounting pin formed integrally with said cam follower and extending inwardly from said side wall with the axis thereof parallel to the axis of said first mounting pin; a spacer member formed integrally with said cam follower and slidably mounted on the outer surface of said side wall, rearwardly and forwardly extending aligned arms formed integrally with said spacer member and extending beyond said rear and forward walls, respectively, said rearwardly extending arm being in sliding contact along the top edge thereof with said abutment, a pointer integrally formed adjacent the free end of said forwardly extending arm and extending transversely therefrom, and a cable-connecting notch formed in said free end adjacent said pointer; a coil spring mounted on said first mounting pin, said coil spring having one end thereof extended so as to contact the inner surface of said forward wall and the other end thereof extended and formed around said second mounting pin; and a transparent light conducting member having a base portion secured to the outer surface of said bottom wall, a wedge-shaped upright portion, an arcuate portion connecting said base and upright portions, and shift selector indicia formed on said upright portion, said upright portion being spaced apart from said forward wall, said pointer extending intermediate said forward wall and said upright portion, the end face of said base portion being located adjacent said light source so as to receive light therefrom, said light thereupon being diffused along said base, arcuate, and wedge-shaped upright portions of said light conducting member to uniformly display said indicia in a readily visible manner.

3. For mounting on a vehicular instrument panel including support means and a light source, an indicator mechanism comprising a housing having forward, side, rear, and bottom walls, said rear wall being adaptable for mounting on said support means; a contoured cam slot formed in said side wall; an abutment formed on the outer surface of said side wall adjacent said rear wall; a first mounting pin formed integrally with the inner surface of said side wall adjacent said cam slot; a lever assembly formed of translucent material including a cam follower slidably mounted in said cam slot, a second mounting pin formed integrally with said cam follower and extending inwardly from said side wall with the axis thereof parallel to the axis of said first mounting pin; a spacer member formed integrally with said cam follower and slidably mounted on the outer surface of said side wall, rearwardly and forwardly extending aligned arms formed integrally with said spacer member and extending beyond said rear and forward walls, respectively, said rearwardly extending arm being in sliding contact along the top edge thereof with said abutment, a pointer integrally formed adjacent the free end of said forwardly extending arm and extending transversely therefrom, and a cable-connecting notch formed in said free end adjacent said pointer; a coil spring mounted on said first mounting pin, said coil spring having one end thereof extended so as to contact the inner surface of said forward wall and the other end thereof extended and formed around said second mounting pin; a tapered end face formed on the free end of said rearwardly extending arm; a beveled end face formed on the free end of said forwardly extending arm adjacent said pointer, said tapered end face deflecting light from said light source and diffusing said light along said rearwardly and forwardly extending arms, and said beveled end face deflecting said diffused light from said forwardly extending arm and diffusing said light along said pointer, thereby illuminating said pointer; and a transparent light conducting member having a base portion secured to the outer surface of said bottom wall, a wedge-shaped upright portion, an arcuate portion connecting said base and upright portions, and shift selector indicia formed on said upright portion, said upright portion being spaced apart from said forward wall, said pointer extending intermediate said forward wall and said upright portion, the end face of said base portion being located adjacent said light source so as to receive light therefrom, said light thereupon being diffused along said base, arcuate, and wedge-shaped upright portions of said light conducting member to uniformly display said indicia in a readily visible manner adjacent said illuminated pointer.

* * * * *